United States Patent [19]

Garringer et al.

[11] 4,377,843

[45] Mar. 22, 1983

[54] DATA DISTRIBUTION INTERFACE

[75] Inventors: Roy T. Garringer, Wheaton; Lawrence G. Gierut, Lockport, both of Ill.

[73] Assignee: Wescom Switching, Inc., Downers Grove, Ill.

[21] Appl. No.: 31,374

[22] Filed: Apr. 19, 1979

[51] Int. Cl.³ .............................................. G06F 3/00
[52] U.S. Cl. .................................................. 364/200
[58] Field of Search ... 364/200 MS File, 900 MS File; 370/77, 112

[56] References Cited

U.S. PATENT DOCUMENTS

| | | | |
|---|---|---|---|
| 4,047,246 | 9/1977 | Kerllenevich | 364/200 |
| 4,048,625 | 9/1977 | Harris, Jr. | 364/900 |
| 4,075,691 | 2/1978 | Davis et al. | 364/200 |
| 4,079,452 | 3/1978 | Larson et al. | 364/200 |
| 4,100,601 | 7/1978 | Kaufman et al. | 364/200 |

*Primary Examiner*—James D. Thomas
*Assistant Examiner*—David Y. Eng

*Attorney, Agent, or Firm*—Leydig, Voit, Osann, Mayer & Holt, Ltd.

[57] ABSTRACT

A microprocessor-based circuit for interfacing between a plurality of serial data terminals and an external parallel data operating system. The interface circuit includes an asynchronous receiver-transmitter, which converts serial data to parallel data and converts parallel data to serial data. The interface circuit multiplexes received serial data from the terminals and couples that serial data to the receiver-transmitter. The microprocessor in the interface circuit further controls the transfer of this now-parallel data to the external parallel data operating system. The microprocessor also controls the transfer of parallel data from the parallel data operating system, which is converted to serial data by the asynchronous receiver-transmitter, demultiplexed by the interface circuit and transmitted to the terminals. Both the transmission and the reception of serial data is coordinated by the microprocessor, which also controls the receiver-transmitter and a set of registers connected to the operating system on a parallel data bus.

16 Claims, 9 Drawing Figures

DATA DISTRIBUTION INTERFACE

BACKGROUND OF THE INVENTION

This invention is in the field of data processing circuitry, and particularly circuitry for interfacing between a number of terminals which communicate in a serial data format and a data processing system which operates upon parallel data. The invention has particular application in the telephone communications arts for handling the digital data portion of the interfacing between a plurality of call-answering terminals and a microprocessor based automatic call distribution section of a telephone switching system.

Heretofore, in data processing systems, conversion between serial and parallel data has been performed by appropriate transformation circuitry associated with each terminal in the system. With a central parallel data processing system and a plurality of remote terminals, for example, the data is communicated between the terminals and the central system over serial data lines. A pair of devices known as receiver-transmitters is associated with each terminal line running to the central processing system. One receiver-transmitter at the terminal converts parallel data to serial data for transmission over the serial data line, and it also converts incoming serial data to parallel data for use at the terminal. The second receiver-transmitter of the pair is connected to the central processing system for similar conversion between the serial data of the serial data line for the terminal and parallel data for use by the central system.

It can be seen that for a large number of terminals, a doubly large number of receiver-transmitters is necessary to communicate with the central processing system. It is also necessary to distribute the parallel date from the central system among the receiver-transmitters, and to assemble this serial data received from the terminals for transmission over the parallel data channel to the central system, which is accomplished by control circuitry.

SUMMARY OF THE INVENTION

The principal object of the present invention is to provide data distribution interface circuits which distribute and assemble data for two-way transmission of data between a central system and a large number of remote serial data terminals, by utilizing single processor controlled asynchronous receiver-transmitters to serve sets of remote terminals, thereby reducing the number of receiver-transmitters required to serve a large number of remote terminals and the complexity of the control circuits.

It is a more particular object of the invention to provide data distribution interface circuits which each include an asynchronous receiver-transmitter controlled by a microprocessor based circuit for converting between serial and parallel data, wherein the microprocessor based circuit not only controls the receiver-transmitter but also communicates with the parallel data operating system.

It is a still more particular object of the invention to provide data distribution interface circuits which are particularly adapted for interfacing between a large number of terminals and a central processing system in a computer operated automatic call distribution system.

Other objects and advantages of the invention will become apparent upon reading the following detailed description and upon reference to the drawings, in which:

BRIEF DESCRIPTION OF THE DRAWINGS

FIG. 1a is a block diagram showing a data distribution interface in relation to a parallel data operating system and an exemplary terminal.

DESCRIPTION OF THE PREFERRED EMBODIMENT

Figure 1:
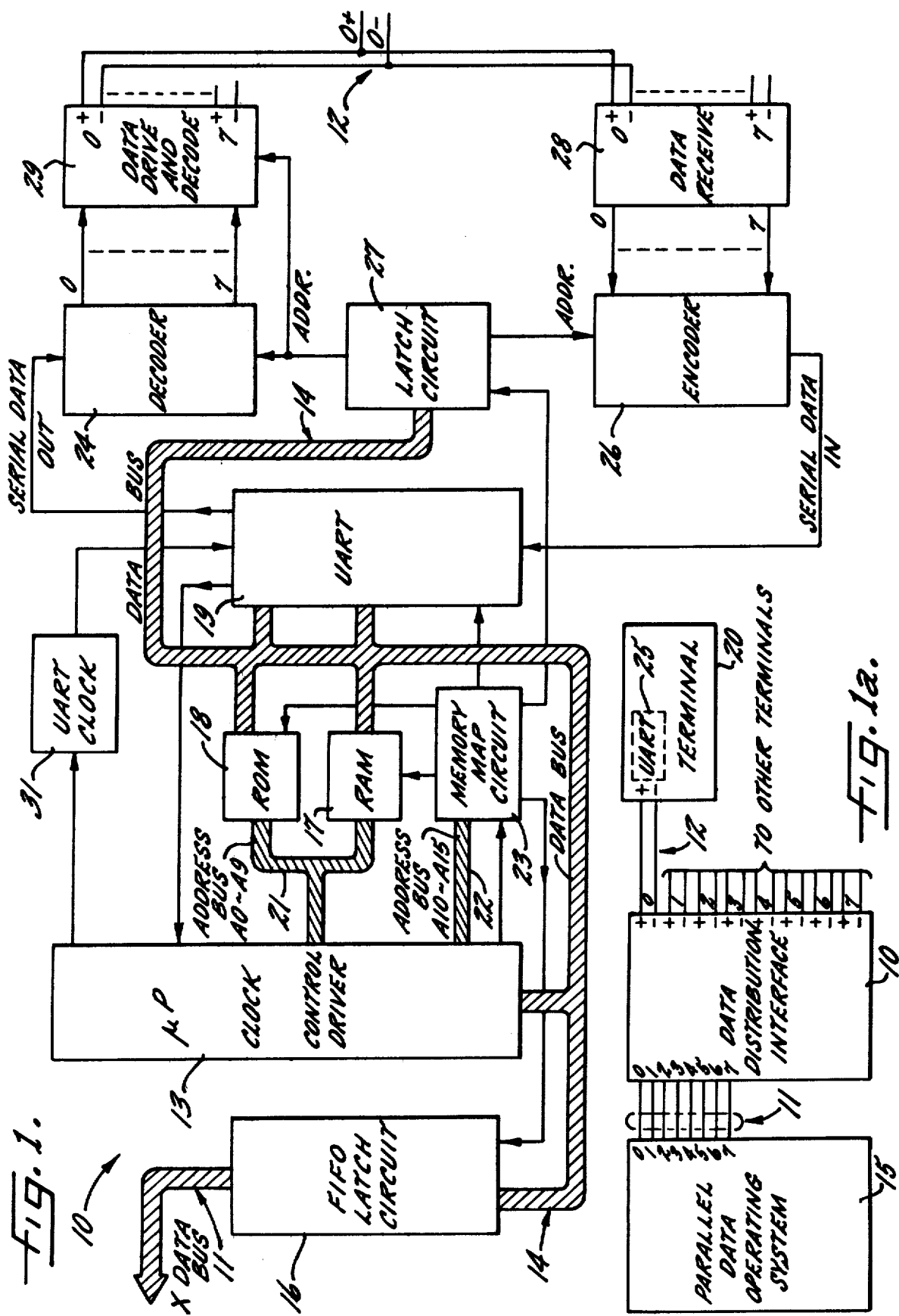
FIG. 1 is a block diagram of a serial/parallel data interface circuit according to the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention.

The most common form of data communications between remote terminal locations and a central data processing or handling system is a serial data format. For example, in an 8-bit data processing system, while data is handled on eight parallel lines on a data bus within the system, data sent to and received from distant terminal locations is in the form of eight bits of data in series, generally accompanied by start and stop bits and a parity bit.

A data format conversion circuit associated with each terminal is located at the parallel data processing system for converting parallel data to serial data and transmitting this serial data on a pair of lines running to each terminal. In the usual system, two additional lines are used for receiving serial data from the terminal, and the converting circuitry for that terminal located at the central data processing system would also convert such incoming serial data to parallel data for use by the system. A commonly employed circuit for effecting the parallel/serial data conversions is known as a Universal Asynchronous Receiver Transmitter, commonly referred to as a UART, and one UART has heretofore been provided at the central processing system for each two pairs of lines connected to a remote terminal.

With initial reference to FIG. 1a, a data distribution interface 10 interfaces between a parallel data operating system 15 and a plurality of serial data terminals 20. The data distribution interface 10 preferably communicates with each serial data terminal 20 on a pair of differential data lines 12, and the data distribution interface preferably communicates with the parallel data operating system 15 on an 8-line parallel data bus 11. While single ended data lines may be employed in place of the differential pairs 12, the differential pairs are preferred, particularly when the terminals 20 are located remotely from the data distribution interface 10. A single differential pair 12 is coupled to each terminal, instead of two pairs, for both transmission and reception. This is possible due to the synchronous communication between each terminal and the DDI 10 as shall be discussed in detail hereinafter. In the present instance, eight parallel data lines comprise data bus 11 for carrying parallel data between the system 15 and the interface 10, but any parallel data format compatible with available data processing equipment may be used, such as a 16-line format.

Generally, the terminal 20 will include a UART 25 for converting between serial and parallel data. The UART 25 will convert between serial data sent and received on serial data line pair 12 and the parallel data circuitry of the terminal 20. A parallel data bus connection cannot be made directly between the parallel data operating system 15 and a remote terminal 20 due to factors such as noise which degrade the integrity of the data and because of cost involved in using eight wire cabling.

The data distribution interface circuit of this invention is especially suited to receive parallel data from a multiprocessor based control complex and switching network having the construction described in the Pitroda et al. United States patent application Ser. No. 842,091, filed Oct. 17, 1977, and entitled Microprocessor Control Complex now U.S. Pat. No. 4,256,926. This interface circuit is further suited to exchange data with the remote call-answering terminals to facilitate an automatic call distribution function for the system disclosed in the above-mentioned patent application. Such a system includes the means for establishing voice line communication between incoming calls and the call-answering terminals, which would not include use of the data distribution interface 10. Such a system also includes transfer of data and status information with the call-answering terminals, and it is this information that is interfaced by the data distribution interface circuit 10.

An automatic call distribution system must distribute incoming calls from lines and trunks to a plurality of terminal locations where the calls are answered. The system is generally computer or processor based and programmed to distribute the incoming calls on a basis such as assigning a call to the terminal with the fewest number of calls waiting. Many additional functions may be performed by the automatic call distribution system, e.g. recording the time calls are received, numbers of calls, time taken to handle calls by terminal operators, differential loading of different groups of terminals, and over-ride provisions for supervisory terminals. In the illustrated system, the actual voice communication information is switched through a switching network between the incoming lines and trunks and the terminal locations. A computer or processor system controls the switching network and any additional related telecommunications functions to be performed, and the link to that system from the interface circuit of this invention is through the data bus 11. However, the interface circuit plays no part in the actual transferring of voice communication information; the data handled by the interface circuit concerns the non-voice information transferred between the automatic call distribution central system and the terminals. Such information includes transmission of characters to be displayed, commands to turn indicator lights on and off, start and stop beeper tones, and to indicate the status of lights and switches at the terminals.

DATA DISTRIBUTION INTERFACE

In accordance with the invention, and with reference now to FIG. 1, a microprocessor based circuit is utilized by which a single UART is controlled and multiplexed to provide an improved means of communication between a central parallel data system bus and serial data lines to a set or group of remote terminals. As illustrated in FIG. 1, the data distribution interface circuit 10 includes a microprocessor, with associated clock and control driver designated in common as a circuit 13, which communicates on a data bus 14 with a first-in first-out (FIFO) latch circuit 16 which is also connected to the parallel data bus 11 of the central operating system. The data bus 14 also connects the microprocessor circuit 13 with a random access memory (RAM) 17, a read only memory (ROM) 18, a UART 19, and a latch circuit 27 in order to transfer parallel data among the memories, the UART and the latch circuit. A 16 line address bus for the microprocessor circuit 13 is depicted in two sections with a lower order address bus 21 being connected to the memories and an upper order address bus 22 being connected to a memory map circuit 23. Operating on these buses, the microprocessor circuit 13 controls the multiplexing and demultiplexing of received and transmitted serial data and its conversion through the UART 19 to and from parallel data on the data bus 14. The multiplexing and demultiplexing operations are performed through the use of an encoder 26 and a decoder 24 under the control of a latch circuit 27.

GENERAL DESCRIPTION OF SERIAL DATA TRANSMISSION

In order to send an instruction or other data to a particular terminal, the microprocessor circuit 13 first places a data word on the data bus 14 which is read by the latch circuit 27 through an enabling signal from the memory map circuit 23. The latch circuit 27 thereby enables the decoder 24 output line running to the data driver which is coupled to the desired terminal. The microprocessor circuit 13 then places on the data bus 14 data representing the instruction or other information to be sent to the designated terminal and simultaneously enables the UART 19 through the memory map circuit 23 to accept the data. The UART 19 then converts the parallel data into serial form and sends the serial data to the decoder 24 over the "serial data out" line. The serial data is coupled through the decoder 24 and a data driver circuit 29 to the appropriate output line pair through the application of the address from the latch circuit 27. The data driver circuit 29 contains a driver for each output line pair and a decoder for enabling one of the drivers according to the address from the latch circuit.

GENERAL DESCRIPTION OF SERIAL DATA RECEPTION

In the configuration of terminal connections as shown in FIG. 1, with a pair of lines 12 running to each terminal, serial data is received from the terminals over the same lines as those upon which data is transmitted. Data is received from a terminal in a different time frame from the time frame for transmission of data to that terminal. Data is preferably transmitted to a terminal at the same rate at which data is received from that terminal. Data is preferably received from a terminal after the transmission of data to that terminal. Under the control of the microprocessor circuit 13, data transmission to one terminal is preferably simultaneous with data reception from another terminal that data was previously transmitted to. For example, data may be received from terminal 1 during the time in which data is transmitted to terminal 2 and so on. The UART 19 is an asynchronous device capable of receiving and transmitting simultaneously. In this preferred embodiment of the invention eight terminals are disclosed, and a corresponding eight pairs of terminal lines, but the data distribution interface circuit of this invention may be expanded to serve a greater number of terminals limited only by the execution speed of the microprocessor circuit and the rate of data transmission.

Data received from the terminals is multiplexed by an encoder 26 onto a "serial data in" line to the UART 19. The UART 19 then converts this serial input into parallel data which is then transferred to the microprocessor circuit 13 as described hereinafter.

In order to convert between the differential line pairs 12 and single serial data lines, the data receive circuitry 28 is interposed between the terminal lines 12 and the encoder 26. The tri-state logic on the common terminal lines 12 enables the use of time division multiplexing, as shall be described more particularly hereinafter.

GENERAL DESCRIPTION OF MICROPROCESSOR AND MEMORY MAP CIRCUITS

In order to produce control signals for the UART 19 and latch circuit 27, as well as for the memories and the FIFO latch circuit, the memory map circuit 23 receives the upper six address lines 22 from the microprocessor circuit 13 as well as the microprocessors READ and WRITE lines. The READ and WRITE lines and upper address lines are decoded by the memory map circuit 23 to enable one of the circuits controlled by the memory map circuit to transmit or receive data on the data bus 14.

For example, the memory map circuit 23 would be properly addressed by the microprocessor circuit 13 to enable the ROM 18 to be read by the microprocessor circuit 13. Subsequently, the microprocessor circuit 13 enables the latch circuit 27 to read the data word, previously read by the microprocessor circuit from the ROM 18, from a temporary memory location in the microprocessor onto the data bus 14 to be written into the latch circuit 27 and coupled through the latch to its outputs, addressing the decoder 24 and the encoder 26.

Similarly, the memory map circuit 23 decodes any upper level address and either a READ or WRITE command from the microprocessor circuit 13 to instruct the appropriate peripheral circuit to either read data from the data bus 14 or to write data on to the data bus. In order to write parallel data from the UART 19 onto the data bus 14, a data ready signal is provided from the UART to the microprocessor circuit 13. Subsequently, acting through the memory map circuit 23, the microprocessor circuit 13 enables the UART 19 to write data on to the data bus 14 which is then written into the desired location such as the RAM 17 or the FIFO latch circuit 16. In order to write data into the UART 19 for subsequent serial data transmission, the microprocessor circuit 13 acts through the memory map circuit 23 to enable the UART to receive data at the same time as appropriate data is placed on the data bus.

The reading and writing of serial and parallel data by the UART 19 requires a UART clock. Rather than use a separate clock, in the preferred embodiment the normal clock generator for the microprocessor circuit 13 is divided down by the UART clock circuitry 31 in order to provide clock pulses for the UART 19. There is no synchronization between the microprocessor clock and the clock pulse output of the UART clock circuit 31.

GENERAL DESCRIPTION OF MEMORIES AND FIFO LATCH CIRCUIT OPRATION

In addition to control communication with the data bus 14 by the UART 19 and latch circuit 27, the memory map circuit 23 also enables reading from the ROM 18 and reading and writing from and to the RAM 17 and the FIFO latch circuit 16.

In order to read a data word from the RAM 17, and place it on the data bus 14, the memory map circuit 23, acting under the control of the microprocessor circuit 13 as described above, enables the RAM 17. In order to place the desired data word onto the data bus from the RAM 17, the lower ten lines of the address bus 21 are simultaneously driven to produce a unique address for the RAM selecting the data word at a particular location, which is then written on to the data bus 14. In order for the RAM 17 to read a data word from the data bus 14, a read-enable signal is provided from the memory map circuit 23, and the location for the word to be placed in the RAM is determined by the address on the lower level address bus 21.

In order to read data from the ROM 18, an appropriate enable signal from the memory map circuit 23 is provided to the ROM, while the microprocessor circuit addresses the appropriate memory location on the bus 21. As indicated above, the memory map circuit 23 enables communication by the data bus 14 with the UART 19; however, no address bus lines are needed to the UART since the UART has only one input and one output location or port.

The memory map circuit 23 further provides enable signals to the FIFO latch circuit 16, which communicates with the parallel data bus 11 of the central processing system. The latch circuit 16 may be enabled to either read or write data, and the data flows in each direction through a different section of the latch circuit 16. No address information is needed for the reading and writing of data with the FIFO latch circuit since incoming data from the data bus 11 to the data bus 14 is provided on a first-in first-out basis, and the data flowing out from the data bus 14 to the data bus 11 through the latch circuit 16 is also on a first-in first-out basis. In other words, there are no internal addressable locations for data within the FIFO latch circuit 16.

DETAILED DESCRIPTION OF SERIAL DATA TRANSMISSION

Figure 2:
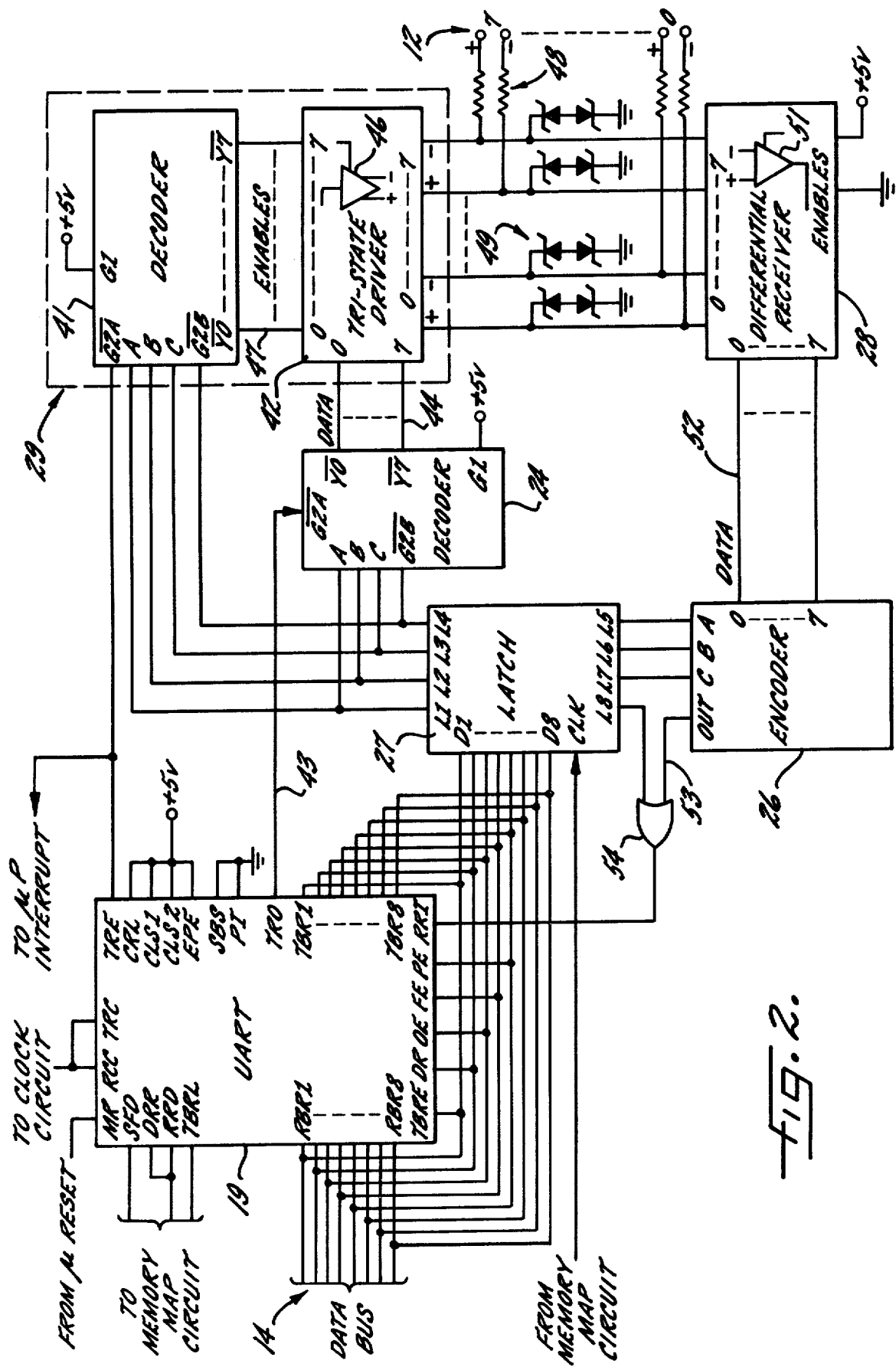
FIG. 2 is a more detailed circuit diagram of the serial data-handling portion of the circuit of FIG. 1.

Referring now to FIG. 2, the exchange of data between the UART 19 and the remote terminals 20 (FIG. 1a), and the conversion of serial data to parallel data and vice-versa by the UART 19 will now be described in more detail. The transmission of data to a particular terminal is inititated by the microprocessor circuit 13 placing an 8-bit data word containing the 4-bit address of the terminal from which data is to be received on the data lines D8 through D5 and the 4-bit address of the terminal to which data is to be transmitted on data lines D4 through D1 on the eight line data bus 14 while the memory map circuit 23 (FIG. 1) clocks the latch 27.

Clocking the latch 27 places the four data bits received at latch inputs D1 through D4 onto its outputs L1 through L4 and the inputs at D5 through D8 onto outputs L5 through L8. These L1 through L4 outputs will subsequently be decoded by the decoders 24 and 41 for placing serial data on the pair of serial data lines 12 connected to the addressed terminal. The data bits received by the latch 27 on input lines D5 through D8 and coupled to the outputs L5 through L8 address an encoder 26 for receiving data from the terminals, the operation of which shall be described hereinafter. As indicated above, the memory map circuit 23 produces signals in response to microprocessor control on the upper address lines of the microprocessor address bus. The details of the memory map circuitry shall be discussed in more detail hereinafter.

In the particular preferred embodiment of the present invention disclosed herein, the UART 19, which is used for serial/parallel data conversion, is an HD-6402 Universal Asynchronous Receiver Transmitter manufactured by the Harris Semiconductor Products Division of Harris Corporation of California. UART's of similar structure are available from several manufacturers. As indicated above, the transmitter section of the UART 19 is separate from the receiver section and the two sections are independently operable. The transmitter section receives parallel data from the data bus 14 on the input terminals TBR1 to TBR8 and transmits the data in serial form from the output terminal TRO.

After the particular terminal to which data is to be transmitted has been addressed at the decoders by the latch 27, data is loaded into an internal transmitter buffer register of the UART 19 from the data bus 14 through inputs TBR1 through TBR8. A logic low on the UART input TBRL from the memory map circuit effects the loading of the data into the transmitter buffer register of the UART 19.

The UART 19 subsequently transfers the data from the transmitter buffer register to a transmit register internally and then starts serial data transmission on the output TRO. During the time that the transmitter buffer register contains data, the terminal TBRE is cleared, indicating that the transmitter buffer register is not empty, but an output does not actually appear at the terminal TBRE except when the input SFD of the UART 19 is pulsed by the memory map circuit.

During the time that there is data in the transmitter register of the UART 19, the output TRE of the UART 19 is low indicating that the transmitter register is not empty. The output TRE of the UART is coupled to the microprocessor interrupt input to provide the microprocessor with an indication as to when the transmission is completed. The output TRE of the UART is also coupled to the input not-G2A of a decoder 41 in the data drive and decode circuit 29.

The serial data output on line 43 from the terminal TRO of the UART 19 is coupled to the input not-G2A of the decoder 24. In the preferred embodiment both the decoder 24 and the decoder 41 are integrated circuits type 74LS138 such as manufactured by Texas Instruments. The decoders 24 and 41 operate such that if the input G1 is high and both the input not-G2A and the input not-G2B are low, a low will be produced on one of the eight data output lines 44, which output line is selected by the 3-bit binary code on the decoder inputs A, B and C.

Thus, for the transmission of data, the input not-G2B of the decoder 24 is held low by output line L4 of the latch 27, and the desired data output line 44 is addressed by the output lines L1 through L3 of the latch 27. Low pulses on the TRO output line 43 into the input not-G2A of the decoder 24 produce corresponding low pulses on the addressed output line 44. The addressed output line 44 is connected to a tri-state driver 42 in the data drive and decode circuit 29.

The enable signal for the appropriate driver device 46 in the tri-state driver circuit 42 is obtained from the decoder 41. The same L1 through L4 output lines of the latch 27 that are connected to the decoder 24 are also connected to the A, B, C and not-G2B inputs, respectively, of the decoder 41. During the time that data is being transmitted on line 43 from the output TRO of the UART 19, the output TRE of the UART is held low, providing a low input to the input not-G2A of the decoder 41. As can be seen, since the same address from the latch 27 is provided to both the decoder 24 and the decoder 41, only the appropriate driver device within the tri-state driver circuit 42 is addressed by the decoder 41, with an enabling low signal provided on the input not-G2A from the output TRE of the UART 19.

A typical driver is schematically shown as device 46 within the block for the tri-state driver circuit 42. Thus, for a selected data line, corresponding to a selected pair of terminal output lines, an individual driver device 46 receives serial data from an input line 44 and is enabled by an enabling line 47 from the decoder 41, placing serial data onto the differential output lines 12 for coupling the serial data to the remote terminal.

Thus, for example, in order to transmit serial data from the UART 19 to terminal 0, the corresponding driver device 46 for terminal 0 receives the serial data on the first output line 44 of the decoder 24, is enabled by the first enabling line 47 of the decoder 41, and places the serial data output on the differential line pair coupled to terminal 0.

In the preferred embodiment the tri-state driver circuitry is contained on an integrated circuit type AM26LS30, such as manufactured by Advanced Micro Devices of Sunnyvale, California. The significance of the use of a tri-state driver 42 is that the same pair of output lines 12 may also be used as input lines for receiving serial data from the associated terminal. The serial data output signal from a tri-state driver is differentially imposed on the outputs, one with reference to the other, rather than using a reference to ground. The third state for the outputs other than high or low is a high impedance disconnect state which occurs when no enabling signal is received by the driver device 46. Thus, each of the eight driver devices 46 for the eight terminal line pairs presents a high impendence to the line pairs except in the case in which that particular device is enabled, whether or not serial data is received at the input of the device. Therefore, data can be transmitted over the line pair to a particular terminal and the driver device for that line pair subsequently disabled so that the same line pair can be used for receiving data from the terminal.

Each of the 16 lines from the terminals is preferably protected from current surges by a current limiting resistor 48 and protected against voltage transients by a pair of zener diodes 49.

In the system disclosed herein, the L4 output of the latch 27 is, during correct operation, maintained low in order to hold the inputs not-G2B of the decoders 24 and 41 low. This address line may be used to expand the system from 8 to 16 terminals by using an appropriate pair of decoders and additional drivers. In that case the inputs not-G2B of the additional decoders would be maintained low, for example, by tying them to ground, and the L4 output of the latch 27 would be connected to the G1 inputs of the additional decoders.

As indicated above, serial data may be received over any pair of lines from a terminal which is not itself then receiving transmitted serial data. Conveniently, data may be received from a terminal while transmission of data is made to the succeeding terminal.

DETAILED DESCRIPTION OF SERIAL DATA RECEPTION

In order to receive serial data from the terminals the serial data line pairs 12 connected to the terminals are coupled to a differential receiver 28, which in the preferred embodiment is an integrated circuit type AM26LS32, such as manufactured by Advanced Micro Devices. Eight receiver devices 51 are included in the receiver circuit, and they convert the differential serial data to ground reference serial data. The enable inputs for the receiver chip are tied to ground and to plus 5-volts as appropriate to ensure that all of the receiver devices are continuously enabled. Thus, the eight serial data lines 52 coupled between the differential receiver circuit 28 and the encoder 26 are constantly enabled and will carry any incoming serial data. The encoder 26 is, as indicated above, addressed at its A, B and C inputs by the L5 through L7 outputs of the latch 27. The three line address is in binary code enabling one of the eight incoming data lines 52 to be coupled through the encoder 26 to an encoder output line 53.

The output at L8 of the latch 27, during proper circuit operation, is maintained low and provides one input to an OR gate 54, whose other input is from the output of the encoder 26. As indicated above in regard to latch output L4, output L8 may be utilized to expand the system to a 16 terminal system. With the low input to the OR gate 54 from the L8 output of the latch 27, serial data from the addressed terminal which appears on the output line 53 is coupled through the OR gate to the RRI input of the UART 19.

In the preferred embodiment encoder 26 is a multiplexer integrated circuit type 74LS151, and the latch 27 is an integrated circuit type 74LS374, both such as manufactured by Texas Instruments of Dallas, Texas.

In order to write received serial data into the UART 19, a logic low to the inputs DRR and RRD of the UART 19 from the memory map circuit clears the terminal DR of the UART 19 and enables the UART 19 to drive the previously received serial data, now converted to parallel data by the UART 19, onto the data bus 14, and serial data from the output of the OR gate 54 is coupled into the UART 19 through the terminal RRI to an internal receiver register of the UART. After sufficient time has elapsed for data to be fed into the receiver register of the UART, the data is transferred to an internal receiver buffer register coupled to terminals RBR1 through RBR8 and the terminal DR is reset to a logic high indicating that the receiver register is once again ready to receive data.

The memory map circuit then sends a low pulse to the input SFD of the UART 19 to remove output terminals TBRE, DR, OE, FE and PE from their high impedance state, placing the outputs from these internal status locations on lines 1 through 5 of the data bus 14. In addition to the above-described conditions of terminals TBRE and DR to be checked by the microprocessor, the output at terminal OE, if a logic high, indicates an overrun, which means that terminal DR was not cleared before the present data character was transferred to the register RBR. A logic high on terminal FE indicates that an invalid stop bit was received, that is, a framing error. A logic high on terminal PE indicates a parity error.

The UART 19 internally adds data bits to the serial data being transmitted and removes such extra data bits from the serial data which it receives. A start bit is used preceeding the 8-bit word being transmitted or received, and there is a stop bit at the end of the data. In addition, there is a parity bit, which in the present embodiment provides odd parity.

DETAILED DESCRIPTION OF MEMORY MAP CIRCUITRY

The memory map circuitry generates the specific signals received by the UART 19 and the latch 27 in order to coordinate and control the serial data transfers between the UART 19 and the various terminals on terminal line pairs 12. As shown in FIG. 1, the upper six address lines from the microprocessor circuit 13, A10 through A15, are coupled to the memory map circuit 23 for processing therein.

The memory map circuit 23 shall now be described in detail and its production of the signals to control the UART operation and the other generated control signals which are coupled to the memories 17 and 18 and the FIFO latch circuit 16, to be further described hereinafter.

A. READ AND WRITE ENABLE DECODERS

Figure 3:
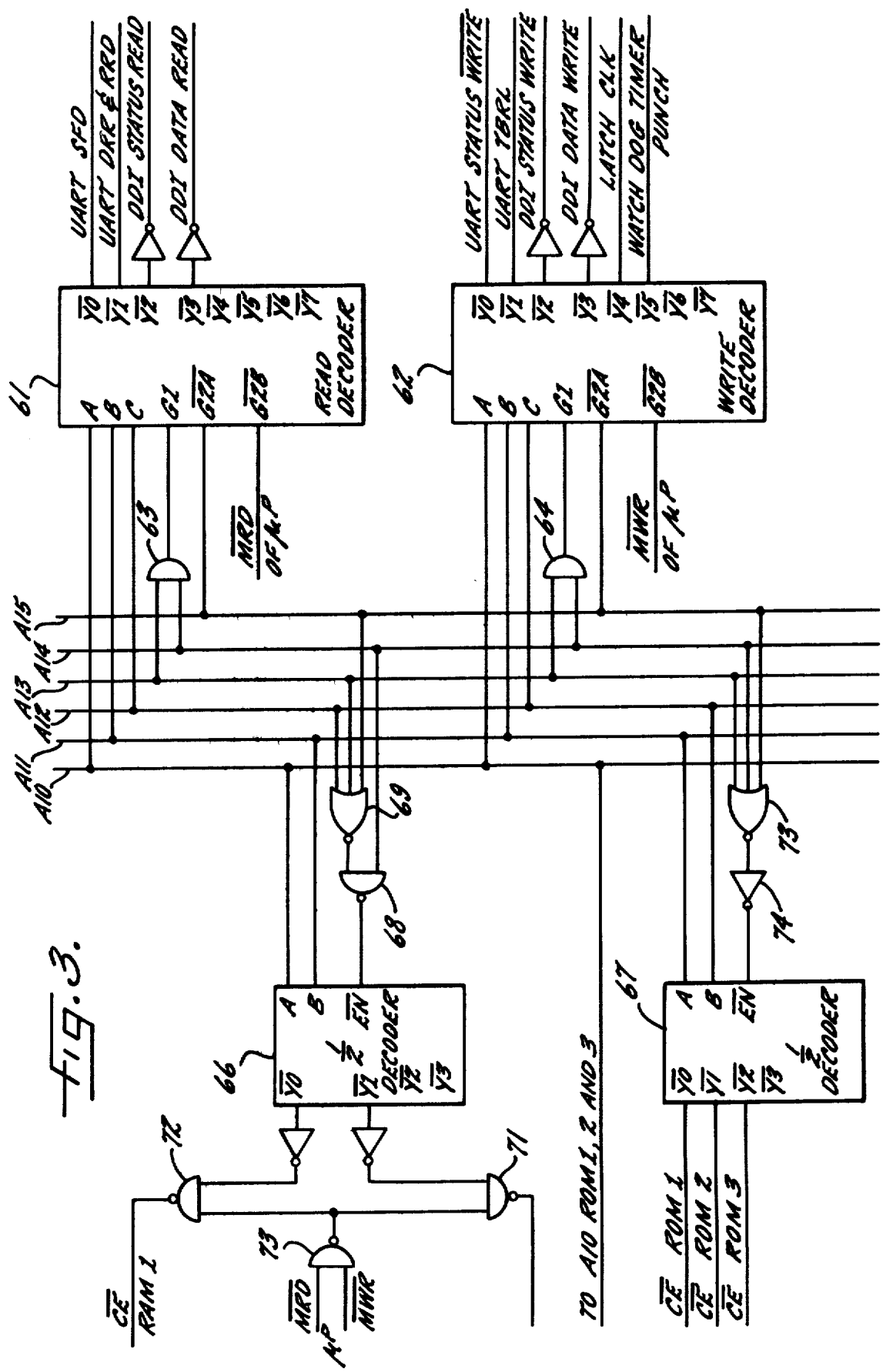
FIG. 3 is a more detailed circuit diagram of the memory map portion of FIG. 1.

Referring to FIG. 3, wherein the memory map circuit 23 is shown in detail, the six upper address lines A10 through A15 of the address bus are coupled to a READ enable decoder 61 and also to a WRITE enable decoder 62. In the preferred embodiment these two decoders are type 74LS138 demultiplexers such as used in conjunction with the tri-state driver described above. The connections to the input sides of the two decoders 61 and 62 from the address lines are identical, with the critical connections being the connection of address line A15 to not-G2A and the ANDing together of the A13 and A14 address lines by the AND gates 63 and 64, respectively. If both lines A13 and A14 are high the outputs of the AND gates will be high and therefore G1 of each of the decoders 61 and 62 will also be high.

Referring first to the READ decoder 61, when G1 is high and both not-G2A and not-G2B are low, a low is coupled to one of the eight READ decoder outputs not-Y0 through not-Y7. The particular output going low is determined by the decoding of the 3-bit binary code at the A, B and C inputs of the decoder from the address lines A10 through A12. While the READ functions which may be enabled by the decoder 61 is readily expandable, the present embodiment envisions the use of only the first four READ ouptuts.

The not-Y0 output of the decoder 61 is connected to the input SFD of the URAT 19 (FIG. 2). The outpt at not-Y0 is normally high, disabling the status outputs (TBRE, DR, OE, FE and PE) of the UART 19, but when not-Y0 is addressed (A, B, C low) with both not-G2A and not-G2B low and G1 high, this places a low on terminal SFD of the UART 19, and places the five status indications on the data bus 14 on lines 1 through 5.

With the upper address lines A13 through A15 as indicated above, the lines A10 through A12 are used to select other outputs not-Y0 through not-Y7. A high on line A10 connected to the input A and a low on lines A11 and A12 connected to inputs B and C respectively, of the decoder 61 addresses the not-Y1 output of the decoder so that a low is coupled to the DRR and RRD inputs of the UART 19. This is the signal that resets DR to a low state and enables the UART 19 to drive its received data onto the data bus 14 (FIG. 2).

Similarly, with address lines A1 through A15 in the state indicatd above, a high on line 11 and a low on lines A10 and A12 enables output Y2 of the decoder 61 which is coupled to the DDI status READ terminal for the FIFO circuitry, and highs on lines A10 and A11 with a low on A12 simultaneously enable decoder output Y3 which is coupled to the DDI data READ terminal of the FIFO circuitry. The operation of this circuitry will be subsequently described.

The same connections from the address lines A10 through A15 are made to the WRITE decoder 62, including the ANDing of the address lines A13 and A14 by the AND gate 64. The difference between the decoder 62 and decoder 61 is the input to decoder 62 at the terminal not-G2B from the output not-MWR of the microprocessor 13. Thus, the WRITE decoder 62 is addressed similarly to the decoder 61, but the microprocessor 13 alternatively produces a low pulse to the terminal not-G2B of the decoder 61 or the decoder 62 to enable either a READ or WRITE operation.

The A, B and C inputs to the decoder 62 from the A10 through A12 address lines are in binary code to selectively enable one of the eight outputs not-Y0 through not-Y7. In the exemplary embodiment only six of the outputs are utilized enabling future expansion of the system. The output not-Y0 of the decoder 62 is connected to reset circuitry to be described hereinafter and is designated UART status not-WRITE. The output not-Y1 of the decoder 62 is coupled to the input TBRL of the UART 19, which enables the UART to load the transmitter buffer registers TBR1 through TBR8.

The outputs Y2 and Y3 of the decoder 62 are coupled to the DDI status WRITE and DDI data WRITE inputs to the FIFO circuitry, to be described subsequently. The output not-Y4 of the decoder 62 is coupled to the clock input of the latch 27, which clocks the data from the data bus 14 onto the outputs L1 through L8 of the latch. The output not-Y5 of the decoder 62 is connected to the watchdog timer punch, to be discussed later in conjunction with FIG. 7.

B. RAM AND ROM DECODERS

In the illustrated circuit the higher address lines A10 through A15 are also used to selectively enable a RAM or one of three separate ROM's which make up the ROM memory 18. By expanding the address logic circuitry, a greater number of discrete RAMS or ROMS could be addressed.

In the preferred embodiment, a decoder 66 is used to enable the RAM, and a similar decoder 67 is used to select one of the three ROMS. The decoders used in the preferred embodiment are combined on a single integrated circuit type 74LS139, such as manufactured by Texas Instruments.

To activate the RAM 17, the address lines A12 to A15 are decoded by a NAND gate 68 and a NOR gate 69 to enable the decoder 66. The lower address lines A10 and A11 present a binary code to select one of the four decoder outputs not-Y0 through not-Y3. In the embodiment shown, with only one RAM to be addressed, only the output not-Y0 produces a RAM enable. The system may be easily expanded such as with the addition of a NAND gate 71 to receive an address from decoder output not-Y1. A NAND gate 72 NANDs together the inverted output from not-Y0 of the decoder 66 and the output from a NAND gate 73. The inputs to NAND gate 73 are from the terminals not-MRD and not-MWR of the microprocessor circuit 13.

The NAND gate 72 output provides the enable signal to the not-CE, enable, input of the RAM 17. This signal enables the RAM to either write to or read from its memory whatever is driven on the data bs or whatever is located in the memory location addressed by the lower level address lines A0 through A9. The enable to the RAM from the output of the NAND gate 72 will produce a READ operation unless an additional WRITE-enable is sent from the microprocessor circuit 13 to the RAM 17. A low output from the NAND gate 72 to provide such an enable signal occurs with a high on each of its two inputs, indicating that the microprocessor has enabled either a memory READ or memory WRITE operation and also that the RAM 17 is addressed rather than some other memory or peripheral device.

The inputs not-MRD and not-MWR to the NAND gate 73 are normally high and therefore the output of the NAND gate 73 is normally low holding the output of the NAND gate 72 high preventing enabling of the RAM. In order to enable the RAM, one of the inputs to the NAND gate 73 is brought low by the microprocessor circuitry for a READ or WRITE operation, placing the output of the NAND gate 73 high and consequently one of the inputs to NAND gate 72 high. If the decoder 66 is properly enabled and addressed by the upper address lines A10 through A15, the inverted input to NAND gate 72 from not-Y0 will also be high sending the output of the NAND gate 72 low enabling the RAM.

In the logic circuitry coupled between the A12 through A15 address lines and the not-ENable input of the decoder 66, it can be seen that an enable signal is produced only if lines A12, A13 and A15 are all low and line A14 is high. To obtain a low, enabling output from the NAND gate 68, both inputs to the NAND gate must be high. Therefore, line A14 must be high, and the output of NOR gate 69 must be high. In order for the output of NOR gate 69 to be high, all of the inputs to the NOR gate must be low, that is lines A12, A13 and A15.

The decoder 67 provides the addressing and enabling information to the exemplary three discrete ROM memories used in the present embodiment to comprise ROM 18. The decoder 67 must be enabled through logic circuitry from the address lines A13 through A15, and the appropriate output address obtained from the binary code of address lines A11 and A12, which are coupled to the A and B inputs of the decoder 67. As shown, the lowest address line of FIG. 3, address line A10, is connected to the A10 input of the three ROM memories. An enabling signal may be directed through the decoder 67 to one of three ROMS from the not-Y0 through not-Y2 outputs of the decoder, respectively. The not-Y3 output of the decoder is unused but the ROM memory capacity may be readily expanded by the connection of not-Y3 to an additional ROM memory.

The logic circuitry decoding the address on address lines A13 through A15 to enable the decoder 67 includes a NOR gate 73 and an inverter 74. The enable for the decoder 67 must be low; to enable a ROM memory therefore, the output of the inverter 74 must be low and its input high. To obtain a high input to the inverter 74, the output of the NOR gate 73 must be high, and thus all three inputs to the NOR Gate 73 must be low. Therefore, the address lines A13 through A15 must all be low in order to provide an enable to the decoder 67 to enable one of the ROM memories of the ROM 18.

The particular ROM addressed is determined, as indicated above, by the two bit binary code on address lines A11 and A12. This two bit binary code is decoded by the decoder 67 from its A and B inputs to enable one of the four outputs not-Y0 through not-Y3. The not-Y0 output is coupled to the enable for ROM memory 1, and the outputs not-Y1 and not-Y2 are coupled to enable for the ROM memories 2 and 3, respectively.

The ROM memories utilized in the preferred embodiment are type 2716, the RAM memory, a type 2114, the microprocessor circuitry indicated as 13 in FIG. 1, a type 8080A processor, a type 8228 controller and a type 8224 clock, all as manufactured by Intel Corporation of Santa Clara, California.

DETAILED DESCRIPTION OF FIFO REGISTER OPERATION

Figure 4:
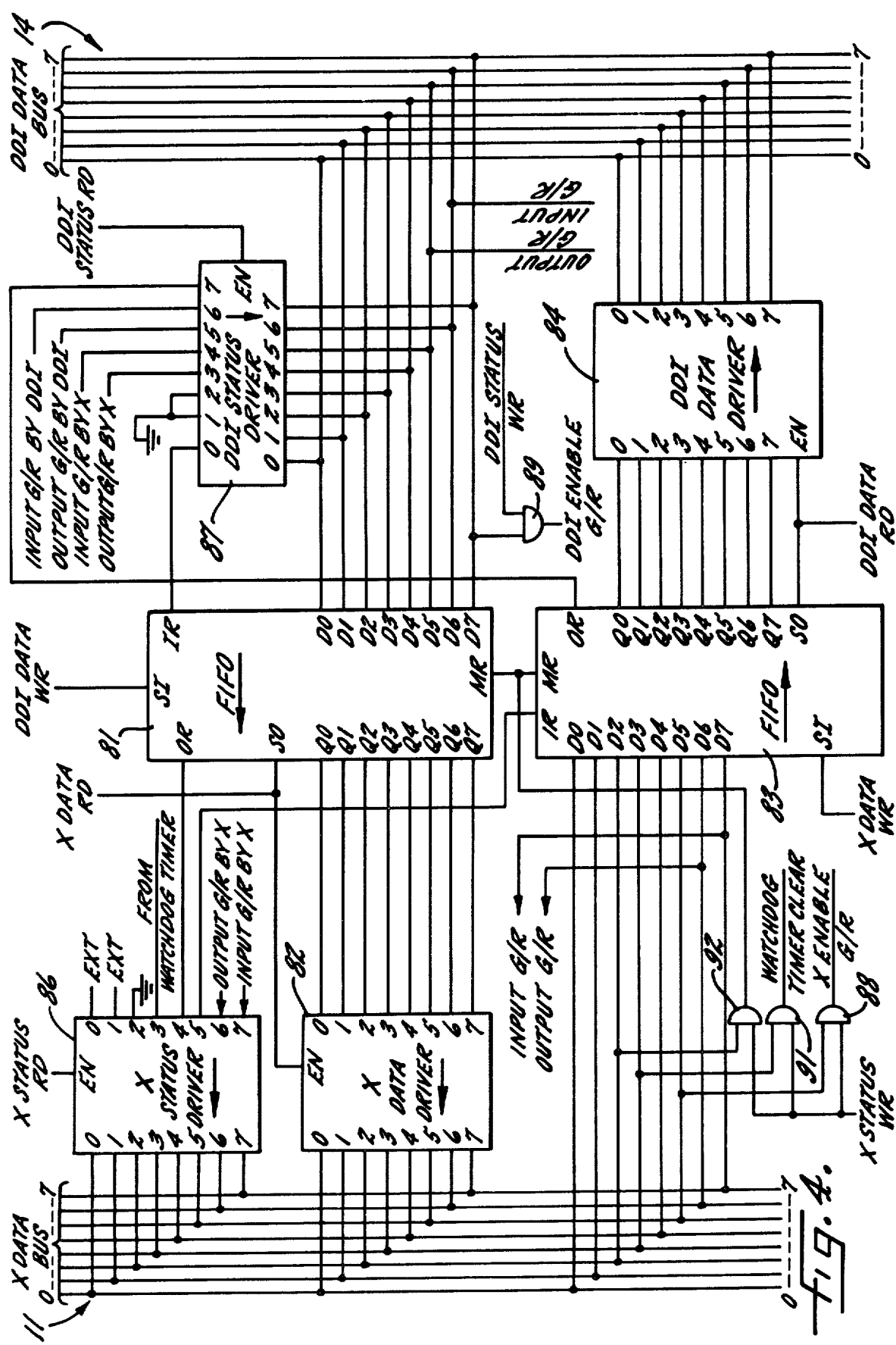
FIG. 4 is a more detailed circuit diagram of the parallel data-handling portion of the circuit of FIG. 1.

The interfacing between the data distribution interface (DDI) data bus 14 and the external, herein referred to as X, data bus 11 is shown in detail in FIG. 4. Two 8-bit first-in first-out (FIFO) registers, one for each direction of data flow, effect the asychronous parallel data exchange between the two data buses. Each illustrated 8-bit FIFO register is a vertically cascaded pair of AM3341 64-word by 4-bit serial memories, such as manufactured by American Microsystems of Sunnyvale, California. Such a vertically cascaded pair of memories would have their input ready (IR) terminals ANDed together and their output ready (OR) terminals ANDed together. Also the shift in (SI) terminals would be connected, and the shift out (SO) terminals would be connected.

The DDI microprocessor checks the IR terminal of the FIFO register 81 on a status READ operation to determine if the register is ready for data to be written into the D0-D7 inputs. Subsequently, the parallel data from the DDI data bus 14 is written into the inputs D0 through D7 of the FIFO register 81 upon the receipt of a logic high from the DDI data WRITE output of the memory map circuit (Y3 of decoder 62 of FIG. 3) which is coupled to the shift in (SI) input of the FIFO register 81. Once data is written into the register, it is internally shifted toward the outputs Q0 through Q7, where the data is available to be read out on a first-in first-out basis.

After an output ready (OR) indication read by the X data bus, the data from the outputs Q0 through Q7 of the FIFO register 81 are read out onto the X data bus 11 through a data driver 82, which includes a tri-state driver device for each of the eight parallel data lines. The data is shifted out of the FIFO register 81 through the placing of a high on the X data READ input to the shift out (SO) terminal of the FIFO register 81. The shift out signal from the X data READ input is also coupled to the ENable input of the X data driver 82, which couples the shifted-out data onto the X data bus 11.

Similarly, after an input ready (IR) indication read from the register 83, data from the X data bus 11 is written into the D0 through D7 inputs of a FIFO register 83 by placing a high-going signal on the X data WRITE input to the shift in (SI) terminal of the register 83. The FIFO register 83 is of the same type as the FIFO register 81.

Again, data written into the FIFO register 83 on the inputs D0 through D7 is internally shifted toward the outputs Q0 through Q7, where the data is available to be read out on a first-in first-out basis. A shift out (SO) and ENable signal received from the DDI data READ output of the memory map circuit (Y3 of decoder 61 of FIG. 3), subsequent to the reading of an output ready (OR) signal by the DDI microprocessor, shifts data from the FIFO register 83 to a DDI data driver 84 and onto the DDI data bus 14.

The X data bus 11 and the DDI data bus 14 are also used for reading and writing status signals in addition to data information. Status information may be read onto the X data bus 11 by providing a high on the X status READ input to the ENable input of the X status driver 86. Similarly, status information may be read onto the DDI data bus 14 by providing an enable pulse from the DDI status READ output of the memory cap circuit (Y2 of decoder 61 of FIG. 3) to the ENable input of the DDI status driver 87. Status WRITE operations may also be performed on both data buses, as shall be described more particularly hereinafter. In the preferred embodiment data driver devices are type 74LS241 integrated circuit devices, such as manufactured by Texas Instruments.

DETAILED DESCRIPTION OF FIFO LATCH GRAB/RELEASE CIRCUIT

Figure 5:
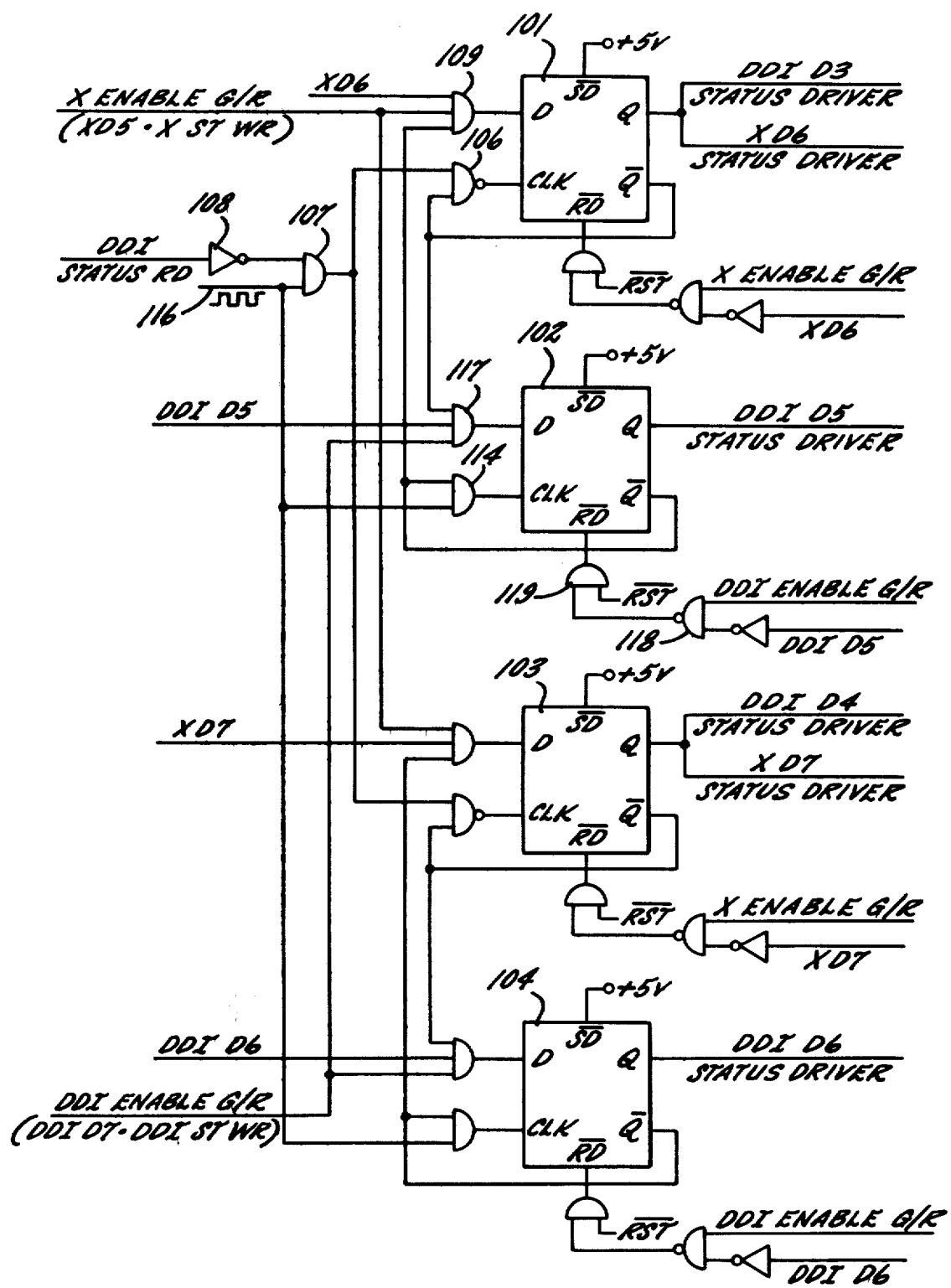
FIG. 5 is a more detailed circuit diagram of further circuitry associated with the parallel data-handling portion shown in FIG. 4.

Despite the asynchronous nature of the FIFO registers 81 and 83, where data may be written into one side of a register at the same time as other data is being read from the other side of the register, in order to prevent the reading of erroneous data where the read and write times on the two sides of the register are different, a grab/release circuit is provided. Thus, a sequence of 8-bit data bytes, or words, is assured of being written into one side of a register completely so that a partial series of bytes is not erroneously read out of the other side. The circuitry to accomplish this is shown in FIG. 5 and operates using the data bus lines during times of stats READ and status WRITE. The grab/release circuit of FIG. 5 is not a hardware lockout of reading or writing to the FIFO registers, but instead provides a software-recognizable signal that one data bus or the other is communicating with one of the registers.

The grab/release circuitry of FIG. 5 comprises four flip-flops 101 through 104. In operation, when the external data processing system wishes to read or write data between the X data bus 11 and the FIFO registers 81 and 83, an X status WRITE signal is clocked through the flip-flops 101 or 103 to place a signal at the appropriate status driver inputs so that a subsequent status READ on either data bus will read a signal indicative of the operation between the X data bus and the registers. Similarly, an appropriate status WRITE signal from the DDI is clocked through the flip-flops 102 or 104 to indicate that a data READ or WRITE operation between the DDI data bus 14 and the registers is about to take place. The Q outputs of the flip-flops 102 and 104 are coupled through the status driver 87 (FIG. 4) in a subsequent status READ operation on the DDI bus to indicate that the external data processing system had not already initiated a data transfer operation, and also thereby indicating that the DDI system has "grabbed" with appropriate FIFO register.

In the following discussion of the operation of the grab/release circuitry of FIG. 5, flip-flops 101 and 102 are concerned with the grab or release of the output, which is the Q0 through Q7 side of the FIFO register 81 wherein data is flowing from the DDI side of the register to the external side of the register. The flip-flops 103 and 104 are concerned with developing grab/release indications for the input, the Q0 through Q7 terminals of the FIFO register 83, wherein data flows from the X data bus 11 to the DDI side of the registers. Further, the flip-flop 101 concerns the external system "grabbing" of the output; the flip-flop 102 concerns the DDI "grabbing" of the output; the flip-flop 103 concerns the external system "grabbing" of the input; and the flip-flop 104 concerns the DDI "grabbing" of the input. Again, the purpose of the grab/release circuitry is to prevent simultaneous reading and writing of data in one of the FIFO registers. Thus, for example, in the operation of the flip-flop 101 circuitry, the external system "grabs" the Q0 through Q7 output of the register 81 so that it can read out data from the register, while the Q output of the flip-flop 101 provides a status signal that the external system is about to initiate a "read", and the software in the DDI system can respond to the signal by delaying writing into the D0 through D7 inputs of the FIFO register 81 until the flip-flop 101 is re-set, indicating the completion of reading by the external system.

The operation of the flip-flops 101 and 102 and their associated circuitry shall now be described in detail. Beginning with flip-flop 101, the initial condition for the flip-flop is in the re-set condition with Q low and not-Q high. The flip-flops are preferably type 74LS74 integrated circuits such as manufactured by Texas Instruments. The not-SD (set) inputs of all of the flip-flops are held at a positive five volts so that the set inputs do not affect the outputs.

The clock input of flip-flop 101 is from a NAND gate 106, one of whose inputs is the not-Q output of the flip-flop 101. Thus, initially, one of the inputs to NAND gate 106 is high. The other input to NAND gate 106 is from an AND gate 107. One input to AND gate 107 is from an inverter 108 from the DDI status READ output of the memory map circuit. The other input to the AND gate 107 is a continuous clock pulse signal derived, for example, from the DDI microprocessor clock. Whenever the input to the AND gate 107 from the inverter 108 is high, the clock signal will pass through AND gate 107 and NAND gate 106 to the clock input of the flip-flop 101. The only time that the other input to the AND gate 107 will be low is during a DDI status READ operation. This is so that the status of the grab/release output Q of flip-flop 101 will not change during a DDI status READ operation.

Thus, with the not-Q output of the flip-flop 101 high and clock pulses being received at the clock input of the flip-flop 101 (assume that a DDI status READ operation is not being performed), a high on the data (D) input to the flip-flop will be clocked through, setting the Q output high and changing the not-Q output of the flip-flop low. The data input to the flip-flop is from a three input AND gate 109, one of whose inputs is from the not-Q output of the flip-flop 102. Initially, this not-Q output will be high and will remain so unless the DDI system has "grabbed" the output of the FIFO register 81 in order to write into the register. The other two inputs to the three input AND gate 109 are from the X data line 6 and the X grab/release enable line. As seen in FIG. 4, the X grab/release enable is the output of an AND gate 88 whose inputs are from the X status WRITE line and the X data bus line 5. In order to provide a data signal to attempt to "grab" the output of the FIFO register 81, the external system must execute a status WRITE command while simultaneously bringing the X data lines 5 and 6 high. This will provide two high inputs to the AND gate 109, and with the other input also high, a high appears at the data input of the flip-flop 101. This high at the data input is clocked through as described above to the Q output of the flip-flop 101 changing the not-Q output of flip-flop 101 low.

The low not-Q output of flip-flop 101 provides a low input to NAND gate 106 terminating the clock inputs to the flip-flop until a subsequent re-set of the flip-flop 101.

The high Q output of the flip-flop 101 is coupled to the DDI status driver 87 (FIG. 4) input for data line 3, and is indicated in FIG. 4 as output grab/release by X. The high Q output from flip-flop 101 is also coupled to the external status driver 86 input for X data line 6, indicated in FIG. 4 as output grab/release by X.

In a subsequent status READ operation by the external system, the high on data line 6 will indicate to the external system that the FIFO register 81 output has been successfully "grabbed" by the external system and a READ operation may begin. Similarly, a status READ operation subsequently performed on the DDI side of the registers will interprete the high on data line 3 to indicate that the external system has "grabbed" the FIFO output and that the DDI should postpone performing a WRITE operation into FIFO 81.

In order for the external system to "release" the FIFO register 81, a reset pulse must be provided to the not-RD (reset) input of the flip-flop 101. To obtain a reset, the X enable grab/release line must go high, which as indicated above requires a status WRITE signal from the external system in conjunction with bringing the X data bus line 5 high, together with a condition that the X data line 6 is low. Thus, for a reset, data line 6 is in the opposite condition as it was for a "grab" operation.

Referring again to FIG. 5, in order to obtain a reset of the flip-flop 101, the X enable grab/release line is high, and the low on the X data line 6 is inverted by an inverter 111 whose output is high. This provides two high inputs to a NAND gate 112 whose output then goes low. A power-on reset line, which is normally high, is the other input to AND gate 113, and thus the output of the AND gate, which was high, goes low, resetting the flip-flop 101. Resetting the flip-flop not only sends the not-Q output high, resuming the flow of clock pulses through the NAND gate 106 to the clock input of the flip-flop, but also sends the Q output low removing the "grabbed" indication from the inputs of the status drivers.

The flip-flop 102 circuitry operates in a similar fashion to that of flip-flop 101 and shall now be described in further detail. The flip-flop 102 produces a signal to indicate that the DDI system has "grabbed" the output of the FIFO register 81 (FIG. 4).

Initially, the not-Q output of the flip-flop 102 is high, providing one high input to an AND gate 114, whose output is coupled to the clock input of the flip-flop 102. The other input to the AND gate 114 is directly from the clock pulses on line 116. The use of an AND gate such as 107 is not necessary since the DDI system cannot be executing both a status READ and a status WRITE operaton at the same time. Therefore, as long as the not-Q output of the flip-flop 102 is in its initial high condition, the clock input of the flip-flop receives clock pulses from line 116 through the AND gate 114. The data input of the flip-flop 102 is from the output of a three input AND gate 117, one of whose inputs is from the not-Q output of the previously described flip-flop 101.

In order for there to be a high on the data input of the flip-flop 102 which can be clocked to the Q output of the flip-flop to indicate that the FIFO register 81 output has been "grabbed" by the DDI system, all three inputs to AND gate 117 must be high. The not-Q output of the flip-flop 101, which is one of the inputs to AND gate 117, will be high if the external system has not previously "grabbed" the FIFO output. A second input to the AND gate 117 is from the DDI data line 5, and the third input is from the DDI enable grab/release line. As shown in FIG. 4, an AND gate 89 ANDs together a DDI status WRITE signal and a high on data line 7 to produce the DDI enable grab/release output. Thus, in order for the second and third inputs of the AND gate 117 to be high, a status WRITE command must be executed by the DDI system through the memory map circuitry accompanied by bringing data lines 5 and 6 of the DDI data bus high.

Assuming that all three inputs of the AND gate 117 are high, there is a high input to the data terminal of the flip-flop 102 which is coupled to the Q output of the flip-flop. The not-Q output of flip-flop 102 goes low, preventing further flow of clock signals through the AND gate 114. The high on the Q output of the flip-flop 102 is coupled to the DDI status driver 87 input line for data line 5, indicated in FIG. 4 as output grab/release by DDI.

A subsequent status read operation by the DDI system will determine that there is a high on data line 5, indicating that the FIFO 81 output has been successfully "grabbed" and that writing into the FIFO may be begun.

The not-Q output of the flip-flop 102 is also connected to one of the three inputs of AND gate 109, whose output is coupled to the data input of flip-flop 101. Therefore, while the DDI system has "grabbed" the FIFO 81 output, the output of AND gate 109 will be held low, preventing a successful "grab" of the same output by the external system. Note that since clock pulses are coupled through a NAND gate 106 to flip-flop 101 and through an AND gate to the flip-flop 102, the clocks are out of phase and both flip-flops cannot be clocked simultaneously.

In order to re-set the flip-flop 102, a low input must be provided to an AND gate 119 whose output is connected to the flip-flop 102 reset, as described above for the AND gate 113 to reset the flip-flop 101. One input to the AND gate 119 is from a power-on reset line which is normally high, and the other input to the AND gate 119 is from the output of a NAND gate 118. In order for the DDI system to "release" the FIFO output, the output of the NAND gate 118 must go low. As can be seen, a DDI status WRITE command accompanied by a high on data line 7 and a low on DDI data line 5 will produce a low on the output of NAND gate 118.

The operation of flip-flops 103 and 104 shall not be described in detail since their operation is completely analogous to the operation of flip-flops 101 and 102.

The flip-flops are utilized to produce similar status signals, except on different data lines, to indicate the grab/release status of the Q0 through Q7 inputs to the DDI system of the FIFO register 83.

MISCELLANEOUS FIFO STATUS OUTPUTS

Referring again to FIG. 4, the remaining status indication lines shall be briefly discussed. The external status driver 86 has eight inputs which may be read onto the X data bus 11 through the application of an X status READ enable signal. In the illustrative embodiment, data lines 0 and 1 are shown coupled from indicators external to the DDI whose status can be monitored, and input line 2 is grounded to provide an indication that the DDI circuit card is plugged in. The data line 3 is from a watchdog timer which shall be discussed briefly hereinafter. Lines 4 and 5 are from the output ready and input ready terminals of the FIFO registers 81 and 83, respectively, indicating whether data may be read or written, assuming that the appropriate grab/release conditions have been met. Lines 6 and 7 are coupled from the Q outputs of the flip-flops 101 and 103, respectively, for reading grab/release status.

The X status WRITE command has been discussed above in regard to producing an enable grab/release signal through the AND gate 88. As shown in FIG. 4, a high on the X status WRITE line may also be ANDed with a high on X data line 3 to provide a signal to a watchdog timer, to be described hereinafter. The X status write signal may also be ANDed with a high on data line 3 by AND gate 92 to provide a master re-set signal for both FIFO registers.

The various status conditions which may be read by the DDI system are the inputs to the DDI status driver 87. Input lines 3 through 6 have been described above in regard to the grab/release system. The data line 0 input to the DDI status driver 87 is coupled from the input ready (IR) terminal of the FIFO register 81, and the data line 7 input to the driver is coupled from the output ready (OR) terminal of the register 83, to indicate ready conditions for transferring data to and from the DDI data bus 14, again assuming that an appropriate grab/release condition has been previously obtained. In the illustrative embodiment, the inputs for data lines 1 and 2 to the driver 87 are shown grounded for purpose of checking connections and for future expansion of the system.

In the present embodiment the only utilization of the DDI status WRITE command has previously been described in relation to the use of AND gate 89 to produce a DDI grab/release enable signal. Obviously, further expansion of the DDI status write capability is available through coding other data lines in conjunction with a status write command.

UART CLOCK CIRCUIT

Figure 6:
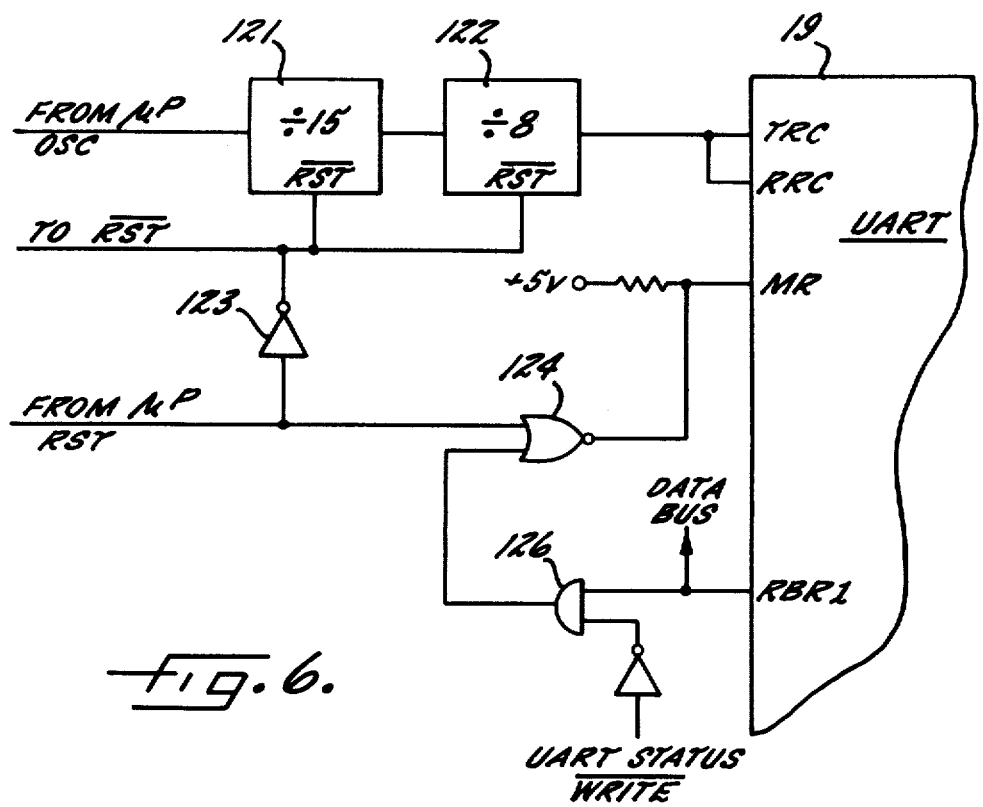
FIG. 6 is a diagrammatic showing of the derivation of some of the clock signals for the circuit of FIG. 1.

In FIG. 6 the UART clock circuitry 31 (FIG. 1) is shown in more detail. The signal from the clock oscillator of the microprocessor circuit 13 is divided down by a divide-by-15 circuit 121 and a divide-by-8 circuit 122. The output of the divide-by-8 circuit 122 provides the clock inputs for the UART 19.

While the UART operates asynchronously from the microprocessor circuitry, there is a connection from the microprocessor master reset to the UART clock circuitry and to the master reset terminal of the UART 19. A microprocessor reset pulse is inverted by an inverter 123 and applied to resets for the divide-by-15 circuit 121 and the divide-by-8 circuit 122. The microprocessor reset pulse is also coupled through a NOR gate 124 to reset the UART 19. In addition, an AND gate 126 can AND together a status not-WRITE signal (not-Y0 of decoder 62 of FIG. 3) from the DDI system with a high on data line 0 of the DDI data bus 14 to produce a reset pulse which is coupled through the NOR gate 124 to reset the UART 19.

WATCHDOG TIMER

Figure 7:
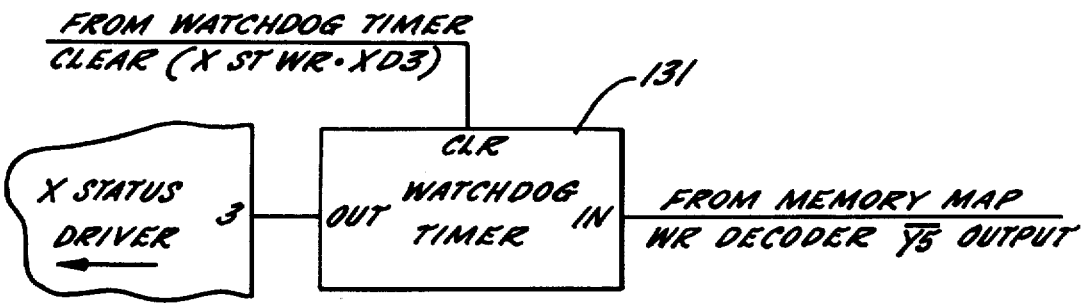
FIG. 7 is a diagrammatic showing of the connections for a watchdog timer for the circuit of FIG. 1.

In FIG. 7 the watchdog timer circuit 131 by which the external system checks the operation of the DDI system is shown. The timer circuit 131 must be pulsed or "punched" by the DDI microprocessor system periodically in order to prevent an alarm signal from being produced at the timer output and coupled to the input for the external status driver 86 (FIG. 4) for external data line 3. Thus, if a periodic status check by the external system detects an output on data line 3, the external system can reset the DDI microprocessor or take other action. The watchdog timer 131 is set to allow a certain period of time to expire before an output signal is produced, and each time the memory map circuit writes a pulse on the WRITE decoder 62 output line 5, this pulse is coupled to the input of the watchdog timer 131 and re-starts another timing cycle. As shown in FIG. 7, the external system may write a clear for the watchdog timer by ANDing an X status write command with a high on X data line 3 as implemented by the AND gate 91 in FIG. 4.

BASIC FLOW CHART OF DDI PROCESSOR OPERATION

Figure 8:
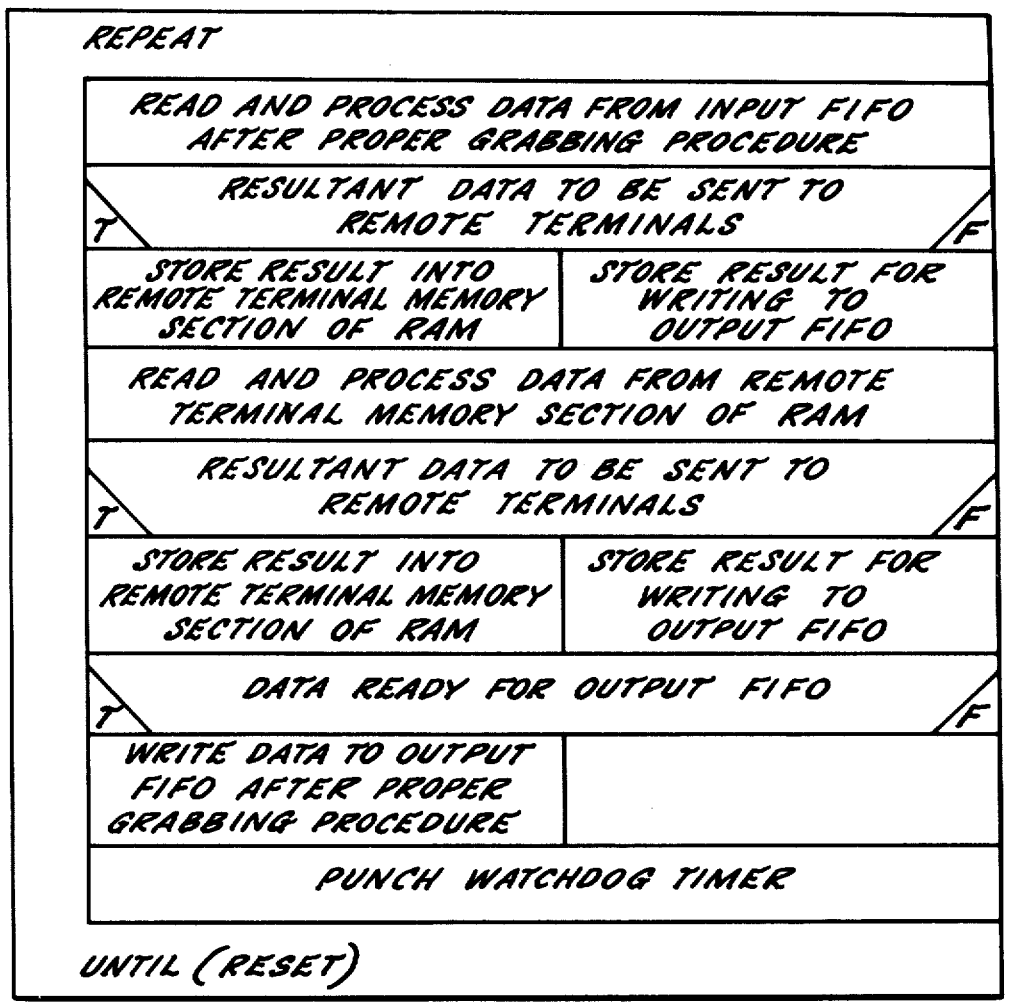
FIG. 8 is an interrupt routine.

As shown in FIG. 8, the basic sequence of operation for the DDI microprocessor begins with the microprocessor reading and processing data from the input FIFO after executing the proper grabbing procedure enumerated above. If the external data system is not writing to the input FIFO, the input FIFO may be successfully grabbed by the DDI microprocessor. The data which is read and processed from the input FIFO produces resultant data generated by the microprocessor.

This resultant data must either be sent to the remote terminals or returned to the external data system through the output FIFO. As to resultant data which is to be sent to the remote terminals, this data is stored into a remote terminal memory section of the RAM. Data which is not to be sent to the remote terminals is stored for writing to the output FIFO.

Next the DDI microprocessor reads and processes data from the remote terminal memory section of the RAM which has been obtained from the remote terminals.

The resultant data from this processing operation may either be sent to the remote terminals or to the external data system through the output FIFO. Resultant data which is to be sent to the remote terminals is stored into the remote terminal section of the RAM, while the remaining resultant data is stored for writing to the output FIFO.

The microprocessor then checks to see if there is data ready for the output FIFO. If there is such data ready, the data is written to the output FIFO after the execution of a proper grabbing procedure to assure that the output FIFO is not then being read by the external data system. After writing data to the output FIFO, or after checking to see if there was data ready for the output FIFO if no such data was ready, the microprocessor punches the watchdog timer.

The basic sequence enumerated above is repeated as indicated in FIG. 8 until the microprocessor is reset.

INTERRUPT FLOW CHART FOR SERIAL DATA TRANSMISSION

Figure 9:
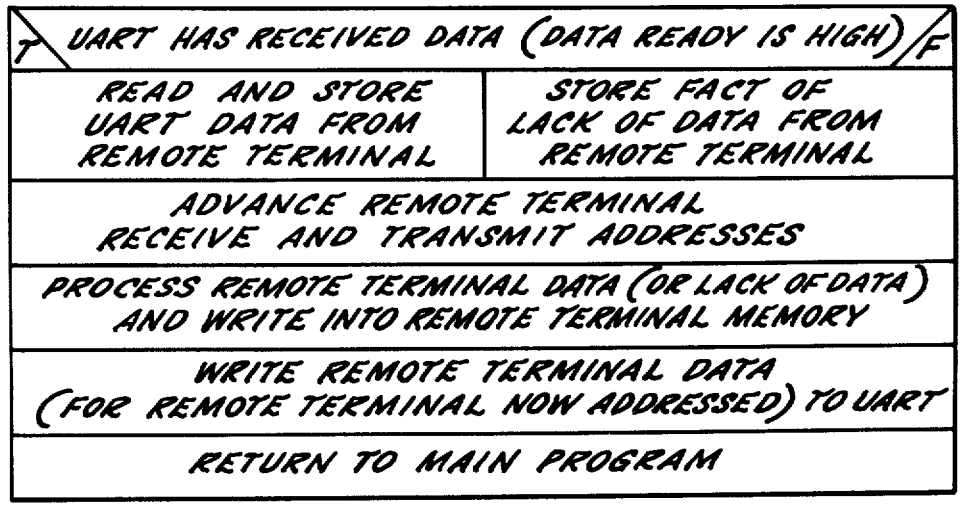
FIG. 9 is a main program.

The communication by the processor through the UART with the serial data remote terminals is performed on on an interrupt basis. When the Transmitter Register Empty (TRE) output of the UART 19 (FIG. 2) goes high, indicating that the UART transmitter register is empty, the microprocessor basic cycle is interrupted and the routine illustrated in FIG. 9 is performed.

The microprocessor first determines if there is data available to be read from the UART. As described above in connection with FIG. 2, the SFD input of the UART 19 is pulsed by the processor and, among other indications, the status indication for the Data Ready (DR) terminal is checked. If the strobed Data Ready line is high, then data is available to be read from the UART. The processor then reads the UART data and temporarily stores it in a section of the RAM.

After reading the UART data, or noting the lack of it, the processor advances the remote terminal addresses through the operation of the latch 27 (FIG. 2) as described above. The remote terminal addresses for both the transmitter and receiver sections are simultaneously advanced.

The microprocessor then processes the remote terminal data which has been read from the UART, or enters into some special processing if there was no remote terminal data, and stores this data in the remote terminal memory section of the RAM. This data is subsequently read from the remote terminal memory section during the cycle of the main program of FIG. 8.

Next, data for the presently-addressed remote terminal is written to the UART for transmission by the UART to that remote terminal. The remote terminal addresses effected by the latch 27 are preferably different, the remote terminal from which data is being received being the remote terminal transmitted to on the previous interrupt cycle. Thus, for example, if at the beginning of an interrupt cycle the latch addresses are for transmission to remote terminal two and reception from remote terminal one, the data read from the UART is that data received from remote terminal one. Then, when the remote terminal addresses are advanced, the receiver for remote terminal two and the transmitter for remote terminal three are addressed by the latch. During the last phase of the interrupt cycle, while the processor is writing remote terminal data to the UART for remote terminal three, the data for remote terminal two is being received by the UART. On the subsequent interrupt cycle, after the remote terminal three data has been transmitted and TRE has again gone high, any remote terminal two data received will be read from the UART.

It can be seen from the foregoing description and figures, that a data distribution interface circuit has been provided which distributes and assembles data for two-way transmission of data between a central system and a large number of remote serial data terminals. More particularly, there has been provided a data distribution interface circuit which includes an asynchronous receiver-transmitter controlled and synchronously multiplexed by a microprocessor based circuit for converting between serial and parallel data, which circuit is particularly adapted for interfacing between a large number of terminals and a central processing system in a computer operated automatic call distribution system.

While the invention has been described in connection with an automatic call distribution system, it will be understood that it is also applicable to various data transmission and conversion systems for data processing equipment.

What is claimed is:

1. A data distribution interface between a plurality of remote serial data terminals and a central parallel data transmission system comprising:

an asynchronous receiver transmitter operable to convert serial data at a serial data input to parallel data at a parallel data output and also operable to convert parallel data at a parallel data input to serial data at a serial data output;

a parallel data bus connected to the parallel data input and output of the asynchronous receiver-transmitter for transmitting parallel data to and from said receiver-transmitter, multiplexer means coupled to the serial data input of the asynchronous receiver-transmitter and to the plurality of remote serial data terminals for coupling data from said terminals to the serial data input of the asynchronous receiver-transmitter;

demultiplexer means coupled to the serial data output of the asynchronous receiver-transmitter and to the plurality of remote serial data terminals for coupling data from the serial data output of the asynchronous receiver-transmitter to said terminals;

a memory coupled to said parallel data bus microprocessor means connected to said receiver-transmitter and said data bus for reading and processing data from the data bus and sending resultant data to the memory, for supplying said multiplexer and demultiplexer means with data representing the addresses of selected remote terminals to which data is to be transmitted and from which data is to be received, and for enabling said receiver-transmitter to supply data to said demultiplexer via said serial data output and to receive data from said multiplexer via said serial data input.

2. The data distribution interface of claim 1 wherein said microprocessor means is connected to said memory and includes means for enabling said memory and said receiver-transmitter to supply said receiver-transmitter with data from selected locations in said memory via said parallel data bus, and to supply selected locations in said memory with data from said receiver-transmitter via said parallel data bus.

3. The data distribution interface of claim 1 which further comprises an asynchronous parallel data transfer latch circuit interposed between the parallel data transmission system and the parallel data bus for temporarily storing data being transmitted between said parallel data transmission system and said parallel data bus.

4. The data distribution interface of claim 1 which includes means for generating a clocking signal, and a latch circuit connected between said data bus and said multiplexer means for supplying said address data to said multiplexer means in response to said clocking signal.

5. The data distribution interface of claim 1 in which the multiplexer means comprises an encoder coupled to the data bus and a tri-state receiver circuit connected between said encoder and said remote terminals for transferring data from a plurality of tri-state data line pairs from the terminals to single data lines which are coupled to the encoder.

6. The data distribution interface of claim 1 in which the demultiplexer means comprises a first decoder receiving serial data from the serial data output of the asynchronous receiver-transmitter, and a second decoder, each of said decoders receiving parallel address data from said receiver-transmitter via said data bus and having a plurality of serial data output lines, and a tri-state driver circuit having a plurality of tri-state driver devices each associated with a remote serial data terminal and connected to the plurality of serial data output lines from the first decoder for transmitting the data on those lines to a plurality of tri-state data line pairs, the first decoder being responsive to said address data to couple incoming serial data from the asynchronous receiver-transmitter to a selected one of the serial data output lines from said first decoder, and the second decoder being responsive to the same address data to select the appropriate tristate driver device in the driver circuit to transmit the serial data from said first decoder on the appropriate data line pair to a terminal.

7. The data distribution interface of claim 1 in which the memory comprises both a read only memory and a random access memory.

8. The data distribution interface of claim 3 in which the parallel data transfer latch circuit comprises a first-in first-out latch for data flow in both directions between the parallel data transmission system and the parallel data bus.

9. The data distribution interface of claim 8 which further comprises a grab/release circuit connected to the first-in first-out latch circuit, the external data operating system and the data bus, the grab/release circuit being responsive to the reading and writing of data for each direction of data flow through the first-in first-out latch circuit to prevent simultaneous reading and writing of data in the same direction.

10. The data distribution interface of claim 1 in which the asynchronous receiver-transmitter is a Universal Asynchronous Receiver-Transmitter.

11. A data distribution interface circuit positioned between a plurality of serial data terminals and a central parallel data transmission system comprising:

converting means for converting serial data at a serial data input to parallel data at a parallel data output and for converting parallel data at a parallel data input to serial data at a serial data output;

a parallel data bus connected to the parallel data input and output of the converting means for transmitting parallel data to and from said converting means;

multiplexer means coupled to the serial data input of said converting means and to the plurality of serial data terminals for coupling data from a selected terminal to the serial data input of the converting means;

demultiplexer means coupled to the serial data output of said converting means and to the plurality of serial data terminals for coupling data from the serial data output of the converting means to a selected terminal;

a memory coupled to said parallel data bus microprocessor means connected to said data bus for reading and processing data from the data bus and sending resultant data to the memory, and for supplying said multiplexer and demultiplexer means with data representing the addresses of selected remote terminals to which data is to be transmitted and from which data is to be received;

means for enabling said multiplexer means to transmit data from said converting means to said selected remote terminals; and means for enabling said demultiplexer means to transmit data to said converting means from said selected remote terminals.

12. The interface circuit of claim 11 in which said microprocessor means synchronously selects the remote terminals to which serial data is to be transmitted and from which serial data is to be received.

13. The interface circuit of claim 12 in which said converting means produces interrupt signals in response to completion of successive data transmissions to said remote terminals, and said microprocessor means synchronously advances its terminal selections in sequential interrupt periods established by the reception of said interrupt signals from the converting means.

14. The interface circuit of claim 11 in which the converting means, multiplexer means, and demultiplexer means include means for simultaneously coupling data from a selected terminal to the serial data input of the converting means and from the serial data output of the converting means to a selected terminal.

15. The interface circuit of claim 11 which further comprises a clock utilized by the converting means.

16. The interface circuit of claim 15 in which the converting means is an asynchronous receiver-transmitter.

* * * * *

UNITED STATES PATENT AND TRADEMARK OFFICE
Certificate

Patent No. 4,377,843            Patented March 22, 1983

Roy T. Garringer and Lawrence G. Gierut

Application having been made by Roy T. Garringer and Lawrence G. Gierut, the inventors named in the patent above-identified, and Wescom Inc., the assignee, for the issuance of a certificate under the provisions of Title 35, Section 256, of the United States Code, adding the name of William A. Fechalos as a joint inventor, and a showing and proof of facts satisfying the requirements of the said section having been submitted, it is this 6th day of Mar., 1984, certified that the name of the said William A. Fechalos is hereby added to the said patent as a joint inventor with the said Roy T. Garringer and Lawrence G. Gierut.

Fred W. Sherling,
*Associate Solicitor.*